(12) United States Patent
Shiohara

(10) Patent No.: US 8,717,478 B2
(45) Date of Patent: May 6, 2014

(54) IMAGING DEVICE, IMAGING METHOD, AND IMAGING PROGRAM

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 12/957,718

(22) Filed: Dec. 1, 2010

(65) Prior Publication Data

US 2011/0128432 A1 Jun. 2, 2011

(30) Foreign Application Priority Data

Dec. 2, 2009 (JP) ................................ 2009-274821

(51) Int. Cl.
*H04N 5/222* (2006.01)
*G03B 13/00* (2006.01)
*H04N 5/232* (2006.01)

(52) U.S. Cl.
USPC ............ 348/333.02; 348/333.03; 348/333.01; 348/346

(58) Field of Classification Search
USPC .......................... 348/333.02–333.05, 345–346
See application file for complete search history.

(56) References Cited

U.S. PATENT DOCUMENTS

| 7,362,367 | B2 * | 4/2008 | Soga | 348/333.03 |
|---|---|---|---|---|
| 8,279,318 | B2 * | 10/2012 | Suzuki et al. | 348/333.01 |
| 2004/0174455 | A1 * | 9/2004 | Soga | 348/348 |
| 2005/0191047 | A1 * | 9/2005 | Toji | 396/111 |
| 2006/0114331 | A1 * | 6/2006 | Tamamura | 348/208.13 |
| 2006/0132612 | A1 * | 6/2006 | Kawahara | 348/208.6 |
| 2008/0074441 | A1 * | 3/2008 | Chujo et al. | 345/634 |
| 2009/0153720 | A1 * | 6/2009 | Suzuki et al. | 348/333.01 |
| 2009/0219415 | A1 * | 9/2009 | Matsunaga et al. | 348/239 |

FOREIGN PATENT DOCUMENTS

| JP | 9-214813 A | | 8/1997 |
|---|---|---|---|
| JP | 2001-309210 | * | 2/2001 |
| JP | 2001-309210 A | | 11/2001 |

* cited by examiner

*Primary Examiner* — Timothy J Henn
*Assistant Examiner* — Pritham Prabhakher
(74) *Attorney, Agent, or Firm* — Global IP Counselors, LLP

(57) ABSTRACT

An imaging device is provided for generating image data on the basis of light received by an imaging element. The imaging device includes a display unit which displays an image, a focus unit which detects a focus deviation, and a display controller which causes the display unit to display a composite image in which a first image of a region of at least a portion of a second image of the image data, and the second image are superposed and combined. The region is in a position in accordance with the focus deviation.

10 Claims, 8 Drawing Sheets

CREATION OF COMPOSITE IMAGE

CREATION OF COMPOSITE IMAGE

IMAGING DEVICE, IMAGING METHOD, AND IMAGING PROGRAM

BACKGROUND

1. Technological Field

The present invention relates to an imaging device, an imaging method, and an imaging program, and particularly relates to an imaging device for displaying, on a display unit, an image generated based on light received by an imaging element, to an imaging method, and to an imaging program.

2. Background Technology

Users of film cameras include those who wish to capture images in which the focus is manually adjusted to the desired focal point. Such users also exist among users of digital still cameras (hereinafter referred to as "DSCs"), and these users desire to manually adjust the focus of a DSC. However, the consistency of focus is difficult to confirm, and the state of focus adjustment is difficult to discern based on a preview image that is displayed on a liquid crystal display or other display unit on the basis of the image captured by a DSC. In order to overcome such difficulty, techniques have been proposed for detecting a focus deviation amount and displaying a split image based on the deviation amount together with the captured image (see Patent Documents 1 and 2).

PRIOR ART REFERENCES

Patent Documents

Patent Document 1: Japanese Laid-open Patent Publication No. 2001-309210
Patent Document 2: Japanese Laid-open Patent Publication No. 9-214813

SUMMARY

Problems to Be Solved by the Invention

However, since the techniques proposed in Patent Documents 1 and 2 above display the split image instead of the captured image on the display unit, the image becomes difficult to see at the location of the split.

The present invention was developed in view of the foregoing problems, and an object of the present invention is to provide an imaging device, imaging method, and imaging program whereby a reduction in the ability to preview an image is minimized, and focus can be visually and easily comprehended.

Means Used to Solve the Above-mentioned Problems

In order to overcome the problems described above, the imaging device according to the present invention is an imaging device for generating image data on the basis of light received by an imaging element, the imaging device comprising a display unit for displaying an image; a focus unit for detecting a focus deviation; and a display controller for causing the display unit to display a composite image in which an image of a region of at least a portion of the image of the image data, and an image in a position offset from the region in accordance with the focus deviation are superposed and combined.

Any device capable of generating an electrical signal in accordance with the intensity of the light received by the light-receiving surface thereof may be used as the imaging element, and examples thereof include CCD (charge coupled device) and CMOS (complementary metal oxide semiconductor) sensors. A liquid crystal display, organic EL display, plasma display, cathode ray tube display, or the like may be used as the display unit insofar as an image can be displayed based on the image data. The region of at least a portion described above may be the entire image or a portion of the image, or there may be a plurality of regions. In the case of a plurality of regions, a composite image may be generated and displayed for each region according to a focus deviation detected for each region, a composite image may be generated and displayed in accordance with the overall focus deviation in all of the plurality of regions, or a composite image may be generated and displayed in accordance with the overall focus deviation in a portion of the plurality of regions.

The image which would be displayed in the abovementioned region on the basis of the image data, and an image in a position offset from the region in accordance with the focus deviation are displayed together in the abovementioned region of the composite image, and these images are offset from each other by a deviation amount in accordance with the focus deviation. Consequently, the image of the abovementioned region is doubled except when the focus deviation is zero. The user of the imaging device can see the amount of deviation of the image in the abovementioned region of the composite image and intuitively comprehend the focus deviation. Since the image which would be displayed in the abovementioned region is displayed, although overlapping with the image at a position offset from the region in accordance with the focus deviation, there is no impediment to comprehending the entire composition including the image in the abovementioned region.

As an alternative aspect of the present invention, a configuration may be adopted in which the display controller causes the display unit to display the composite image in which a color of at least one of the image of the image data and the image of the offset position is varied. By varying the color of each image, the original image and the superposed image are more easily distinguished, and the visibility of the overlapping portions of the images is enhanced.

As an alternative aspect of the present invention, a configuration may be adopted in which the display controller causes the display unit to display the composite image as well as a frame which differs between a focused state and an unfocused state, the frame surrounding the region. Through this configuration, the focused/non-focused states are made distinct, and a clear and intuitive indicator can be provided for focusing and defocusing by the user.

As an alternative aspect of the present invention, a configuration may be adopted in which the display controller causes the display unit to display the composite image as well as a frame surrounding the region when the image is in focus, and causes the display unit to not display a frame surrounding the region when the image is not in focus. Through this configuration, the focused/non-focused states are made distinct, and a clear and intuitive indicator can be provided for focusing and defocusing by the user. Usability can also be enhanced by eliminating the frame which can interfere with image viewing when the image is in focus.

As an alternative aspect of the present invention, a configuration may be adopted in which the focus unit detects a focus deviation in a focus region set in advance; and the display controller causes the display unit to display a composite image in which an image of the focus region and an image in a position offset from the focus region in accordance with the focus deviation are displayed so as to overlap. Designating as a focus region the abovementioned region displayed as a double image makes visible the correspondence between the focus deviation and the double image and enhances operability.

As an alternative aspect of the present invention, a configuration may be adopted in which an operating unit operated by a user is further provided, wherein the display controller sets a plurality of the region within a region of the image in accordance with a predetermined operation performed by using the operating unit. When a plurality of subjects is included in the image, the focus can be confirmed for each subject without moving the imaging device.

The imaging device described above may be implemented in various forms, such as in combination with another device or method. The present invention can also be realized in such forms as an imaging system provided with the imaging device described above, an imaging method or image display method having steps adapted to the configuration of the device described above, an imaging program or image display program for causing a computer to implement a function adapted to the configuration of the device described above, and a computer-readable storage medium in which the program is stored. The inventions of an imaging system, imaging method, image display method, imaging program, image display program, and medium for storing the program exhibit the operations and effects described above. The configurations described in claims 2 through 6 are applicable, of course, to the systems, methods, programs, or storage medium described above.

DESCRIPTION OF EXEMPLARY EMBODIMENTS

Figure 1:
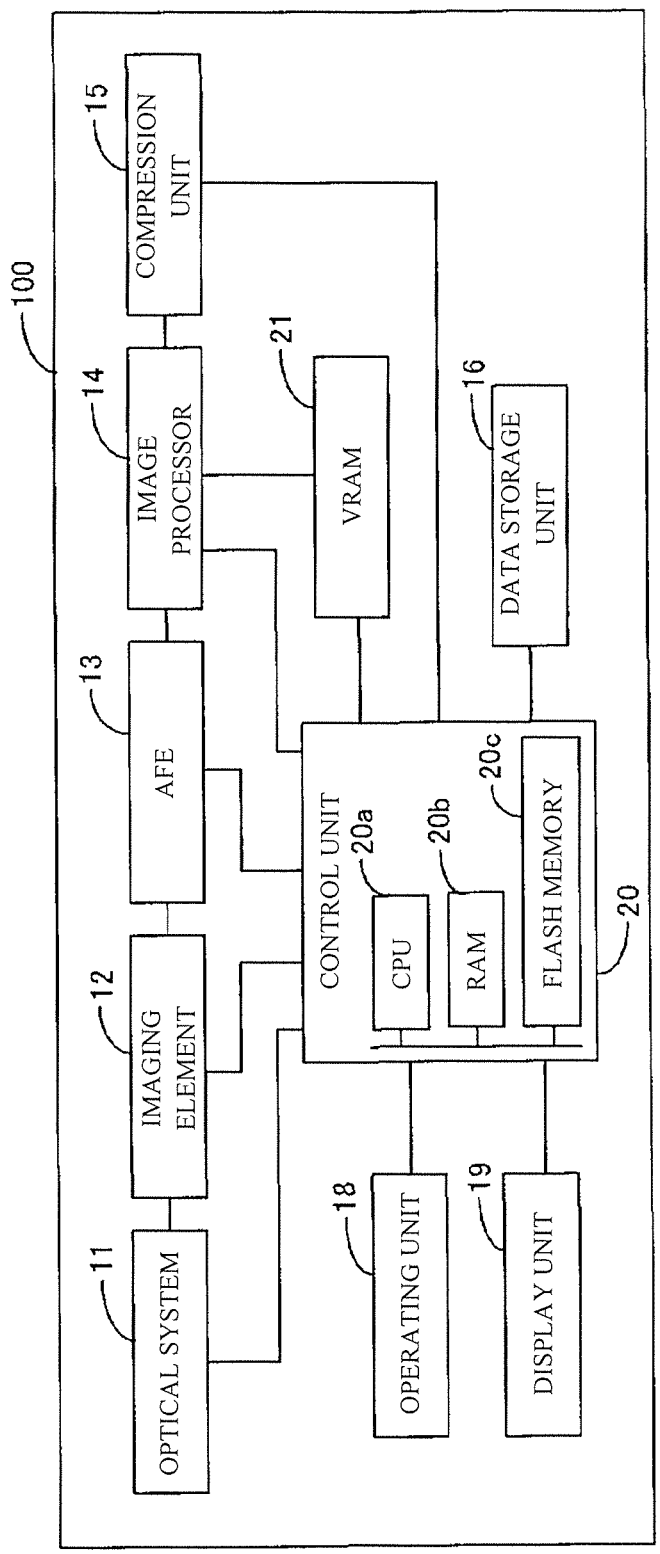
FIG. 1 is a block diagram showing the configuration of a DSC.

Embodiments of the present invention will be described hereinafter in the following sequence.
(1) Configuration of the Imaging Device
(2) Imaging Process
(3) Various Modifications
(4) Conclusion
(1) Configuration of the Imaging Device FIG. 1 is a block diagram showing the configuration of the imaging device according to an embodiment of the present invention. The imaging device according to the present embodiment is a digital still camera 100 (hereinafter abbreviated as DSC 100) which displays an image on a display unit on the basis of image data generated by capturing an image of a subject, and stores in a storage medium the image data generated by capturing an image of a subject. As shown in FIG. 1, the DSC 100 is provided with a control unit 20, and an optical system 11, imaging element 12, analog front end 13 (AFE 13), image processor 14, compression unit 15, data storage unit 16, operating unit 18, display unit 19, and VRAM 21 which are controlled by the control unit 20.

The control unit 20 shown in FIG. 1 is provided with a CPU 20a (computational processing unit), RAM 20b (volatile semiconductor memory), and flash memory 20c (non-volatile semiconductor memory) which are interconnected by a communication bus. The CPU 20a controls the overall operation of the DSC 100 by executing an imaging program stored in the flash memory 20c, while utilizing the RAM 20b as a work area. An imaging process is performed through execution of the imaging program by the control unit 20, and the DSC 100 executes functions corresponding to an imaging unit M1, a display controller M2, a focus unit M3, and other components not shown in the drawing.

The optical system 11 is composed of a lens group, an aperture, and other components not shown in the drawing, and projects an optical image of a subject onto a light-receiving surface of the imaging element 12. In the lens group and aperture, the lens position or aperture size are adjusted by a drive mechanism not shown in the drawing. The control unit 20 controls the drive mechanism, whereby the focus can be placed on or offset from a desired subject in the optical image captured by the DSC 100, and the brightness of the captured optical image can be adjusted.

The imaging element 12 is provided with a plurality of photoelectric conversion elements arranged discretely in two-dimensional space, and each photoelectric conversion element outputs as an electrical signal a charge which is photoelectrically converted in accordance with the amount of light received of the light projected from the optical system 11. The imaging element 12 is composed of a CCD (charge coupled device) or CMOS (complementary metal oxide semiconductor) sensor, for example, and the photoelectric conversion elements constituting the imaging element are arranged in a grid or honeycomb pattern. In the imaging element 12, C (cyan), M (magenta), Y (yellow), and G (green) complementary color filters or R (red), G (green), and B (blue) primary color filters are provided to the light-receiving surfaces of the photoelectric conversion elements in a checkerboard pattern or other pattern, and the imaging element 12 can thereby take in color image information. As shall be apparent, black and white image information may also be taken in by not using the filters described above.

The AFE 13 is provided with an A/D converter, and quantizes the electrical signal outputted from the imaging element 12 and converts the electrical signal to a digital image signal.

The image processor 14 subjects the digital image signal inputted from the AFE 13 to various types of image processing, such as pixel interpolation processing as a "demosaicing" for endowing a single pixel with information of a plurality of colors, white balance correction processing, color reproduction processing through RGB-to-RGB 3×3 matrix computation, sharpness processing, gamma correction processing, and RGB image data formation processing; and creates image data D1 in which each pixel is expressed by an R, G, or B level. The image data D1 may also be expressed as levels other than those of the R, G, B color system (e.g., Y, Cb, Cr, or the like), as shall be apparent.

The image processor 14 also creates display image data D2 for displaying on the display unit 19. The display image data D2 is created by subjecting the image data D1 to aspect conversion or enlargement/reduction. As described hereinafter, there are two types of the display unit 19 of the present embodiment, an LCD 19a and an EVF 19b. The image processor 14 performs aspect conversion or enlargement/reduction and creates the display image data D2 in accordance with the screen size or pixel count selected by the user for the preview screen during image capture. Display image data adapted for an LCD 19a and display image data adapted for an EVF 19b may both be created so that a preview can be displayed by both types of display. The image processor 14 stores the created display image data D2 in the VRAM 21 (graphics memory).

In the DSC 100 of the present embodiment, the display image data D2 of the VRAM 21 are updated at intervals of a predetermined time by the control of the control unit 20. Specifically, the imaging element 12 acquires color image information at intervals of a predetermined time and outputs the color image information to the AFE 13, and the AFE 13 creates a digital image signal in sequence on the basis of the inputted color image information and outputs the digital image signal to the image processor 14. The image processor 14 creates new display image data D2 at intervals of a predetermined time on the basis of the digital image signal and stores the new display image data D2 in the VRAM 21. Display image data D2 that are updated at intervals of a predetermined time are thus appropriately acquired and displayed on the display unit 19, and a preview can thereby be provided that keeps pace with changes in the range of image capture by the user.

The compression unit 15 compresses the image data created by the image processor 14 and generates compressed image data D4 in accordance with control by the control unit 20. The compression format may be nonreversible compression such as JPEG nonreversible compression or TIFF nonreversible compression, or reversible compression such as PNG, JPEG reversible compression, or TIFF reversible compression. The compression unit 15 may also output image data in bitmap format without compression. The compressed image data D4 thus created are outputted to the data storage unit 16. The control unit 20 may also output RAW data, which are not yet demosaiced image data outputted from the AFE 13, to the data storage unit 16 without modification by the compression unit 15.

The data storage unit 16 is provided with a card slot (insertion port) for connecting a removable memory (removable storage medium), for example, or a memory controller for controlling the reading and writing of data with respect to connected removable memory. The data storage unit 16 may also be composed of a fixed storage medium which cannot be removed, as shall be apparent. The data storage unit 16 stores the compressed image data D4 outputted by the compression unit 15 or the RAW data outputted by the AFE 13 in the removable memory in accordance with control by the control unit 20. Through control by the control unit 20, the data storage unit 16 is also capable of reading the image data stored in the removable memory.

The display unit 19 is provided with an LCD (liquid crystal display) and an LCD controller, for example, and the LCD controller controls display by the LCD in accordance with control by the control unit 20. The control unit 20 can display various types of settings or images on the LCD via the LCD controller. In the present embodiment, the LCD 19a and the EVF 19b (electric view finder) are provided as two types as the LCD of the display unit 19. The LCD 19a is often used primarily to display the already captured image in order to confirm the imaging result, whereas the EVF 19b is used to confirm the composition or focus of the image by displaying the optical image inputted from the optical system 11 in real time. Specifically, the EVF 19b is a liquid crystal screen which acts as the viewfinder for confirming the imaged range or the focus in a film camera or the like. A high-temperature polysilicon LCD, which is capable of adapting to detailed, fast-moving subjects, is therefore preferably used in the EVF 19b. An EVF 58 is configured to correspond to the viewfinder of a film cameral, and is therefore formed in a small size similar to that of a human eye.

The operating unit 18 is provided with a shutter button, a dial switch for setting the exposure conditions and various other shooting conditions, a plurality of pushbutton switches for operating various displayed menus, a jog dial, and other controls. By configuring the display unit 19 as a touch panel, operation of the touch panel may constitute the operating unit 18 rather than using pushbuttons or a dial switch to form the operating unit 18.

Figure 2:
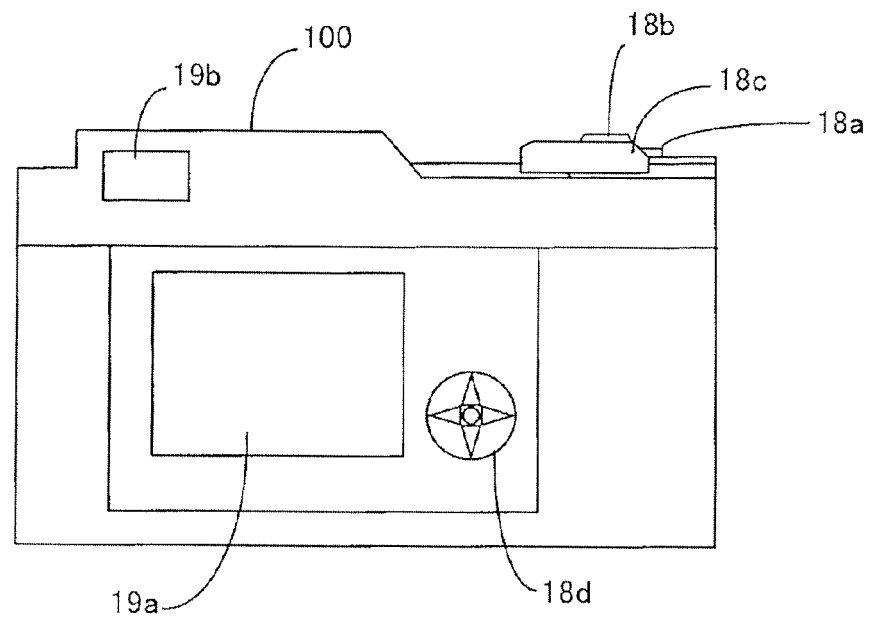
FIG. 2 is an external view showing an example of the exterior of a DSC.
Figure 2:
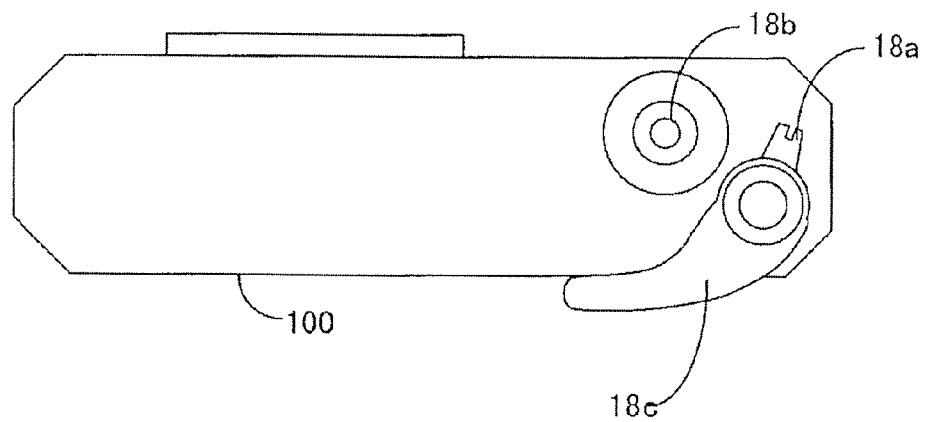

FIG. 2 is an external view showing an example of the outside of the DSC 100. A side view showing the DSC 100 from the side opposite the subject is shown at the top of FIG. 2, and a top view of the DSC 100 is shown at the bottom of FIG. 2.

As shown in FIG. 2, the DSC 100 is provided with a power switch 18a for switching a power supply on and off; a shutter button 18b for indicating to capture an image and perform processing for storing the acquired image data in the removable memory; the LCD 19a for displaying playback of captured digital images, displaying menus for various settings, and providing other displays; a cursor operation key 18d for moving a cursor or the like of a setting menu displayed on the LCD 19a, confirming a menu selection, and performing other tasks; and the EVF 19b for displaying an image of the imaging range prior to image capture. A winding lever 18c is also provided which, by being wound, opens and closes a focal-plane shutter device disposed in front of the sensor, releases a lock for preventing the shutter button from being pushed, or performs other functions.

(2) Imaging Process

Figure 3:
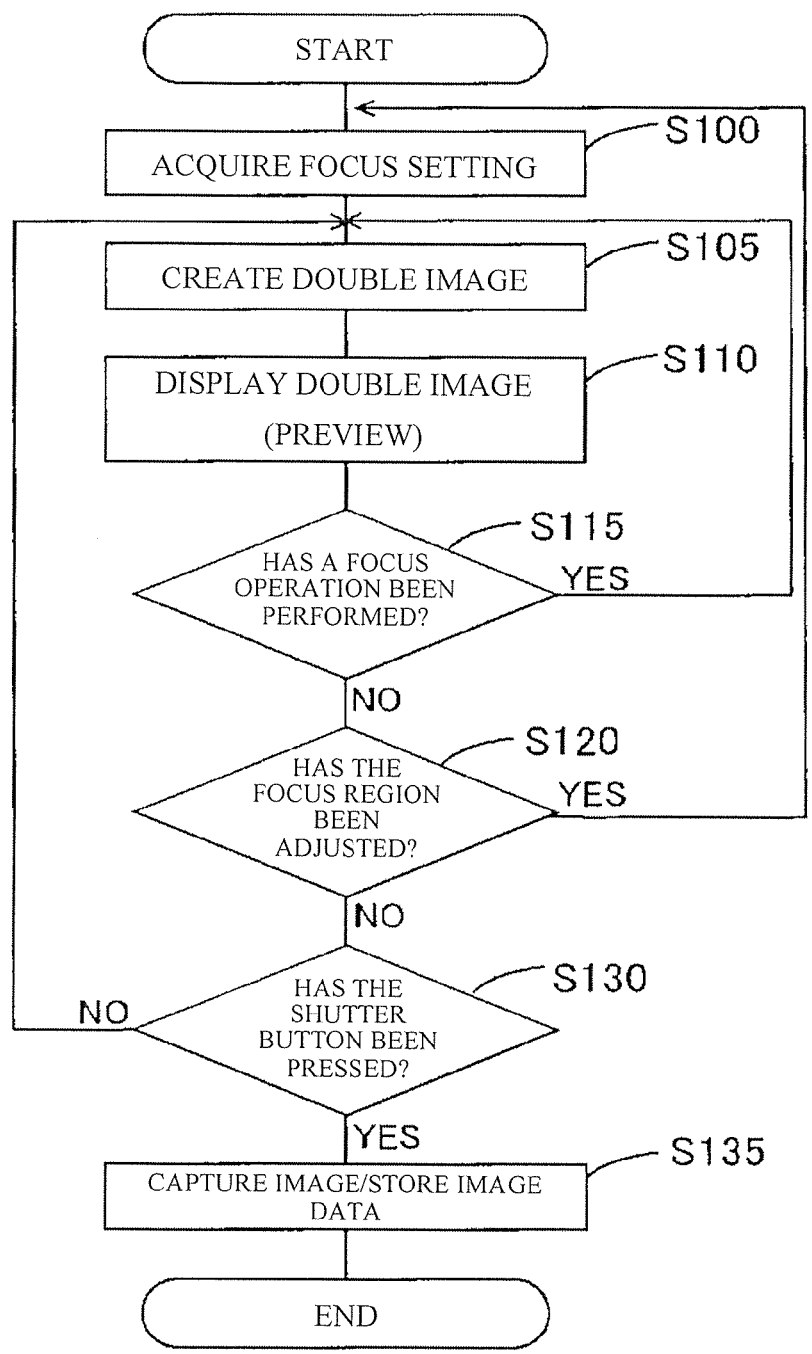
FIG. 3 is a flowchart showing the flow of the imaging process.

The process of manual-focus image capture executed in the control unit 20 through the use of the configuration described above will next be described. FIG. 3 is a flowchart showing the flow of the imaging process. In the imaging process, when the user indicates image capture at the desired timing while appropriately previewing an image in the EVF 19b on the basis of the display image data D2 created according to the captured image, the captured image data are stored in the data storage unit 16. The processing shown in FIG. 3 is executed by the control unit 20 for realizing the functions described above. During the imaging process, the user also performs various adjustments such as changing the composition of the image captured by the DSC 100, adjusting the focus, adding or removing a focus region, and changing the image size. The imaging process described herein is therefore repeatedly executed 30 times or more in one second.

When the process is initiated, the display controller M2 acquires focus setting information from the flash memory 20c (S100). The position and size of the focus region are specified in the focus setting information, and the region of the light-receiving surface of the imaging element 12 to be designated as the focus region is determined based on the focus setting information. In the imaging process herein, a display is provided to indicate the degree to which a subject included in the focus region is in focus. Of course, when capturing an image by autofocus, processing for automatically bringing a subject included in the focus region into focus is executed by a publicly known autofocus technique. The shape of the focus region is described as being rectangular in the present embodiment, but a circle, triangle, or any other shape may also be used.

When setting of the focus region is completed, the focus unit M3 detects a focus deviation (degree of focusing or unfocusing) in the focus region (S105). The focus deviation can be detected by an active method or a passive method.

In the case of an active method, infrared rays, ultrasonic waves, or the like are directed onto an object (subject), the distance between the imaging lens and a subject included in the focus region is detected by the radiation angle or the time taken for a reflected wave to return, and the difference with respect to the focal length of the imaging lens is calculated. When this method is employed, the DSC 100 is provided with radiation means for irradiating infrared rays, ultrasonic waves, or the like to the subject, and receiving means for receiving the reflected waves. The receiving means is also provided with a sensor for detecting the reception angle of the reflected waves, or a timer for measuring the time taken for a reflected wave to return.

In a case in which a focus deviation is detected by a phase difference detection method, which is one passive method, a separator lens and a line sensor are provided to the DSC 100, an interval (phase difference) between two images generated by the separator lens is measured by the line sensor, and the amount of the focus deviation is detected based on the phase difference. At this time, the amount of focus deviation is larger the larger the phase difference is, and the amount of focus deviation is smaller the smaller the phase difference is.

In a case in which a focus deviation is detected by a high-frequency component mountain-climbing method, which is one passive method, the contrast between light and dark image data captured by the imaging element 12 is calculated while the focal length of the main optical system 11 is varied, and the focal length is determined to be correct at the point of greatest contrast. Alternatively, besides calculating contrast, the image data are subjected to spatial frequency decomposition by a discrete cosine transform or other method, and the amount of high-frequency components included in the image of the focus region is evaluated. To accomplish this, the image processor 14 is provided with means for subjecting the image to spatial frequency decomposition, and data concerning the relationship between the amount of focus deviation and the ratio of high-frequency components included in the image. The image processor 14 extracts image data of the focus region from the created image data at any stage of the image processing, and detects the amount of focus deviation on the basis of the ratio of high-frequency components included in the image data.

In order to more accurately evaluate focus deviation by the mountain-climbing method, the focus is varied by causing the lens to minutely fluctuate from a position adjusted by the user while the focus deviation is being detected. Specifically, the focus deviation is larger the more fluctuation occurs in a high-frequency component due to the minute fluctuations of the lens, and the smaller the amount of fluctuation, the more correct the focus is. When the focus is moved toward the background by the minute fluctuation of the lens, the focus is offset toward the foreground when the contrast or high-frequency components are increased, and the focus is offset toward the background when the high-frequency components are reduced. The opposite occurs when the focus is moved toward the foreground by the minute fluctuation of the lens. In a case in which the compression unit 15 has a JPEG compression circuit function, since a discrete cosine transform function is present as part of the JPEG processing, an AC component is extracted by subjecting the image processed by the image processor 14 to the discrete cosine processing of the compression unit 15, and the quantity of a high-frequency component can be evaluated by using the quantity of the AC component.

When a focus deviation is acquired from the focus unit M3, the display controller M2 creates a composite image in which a double image created in accordance with the focus deviation is combined with the focus region A (S105).

Figure 4:
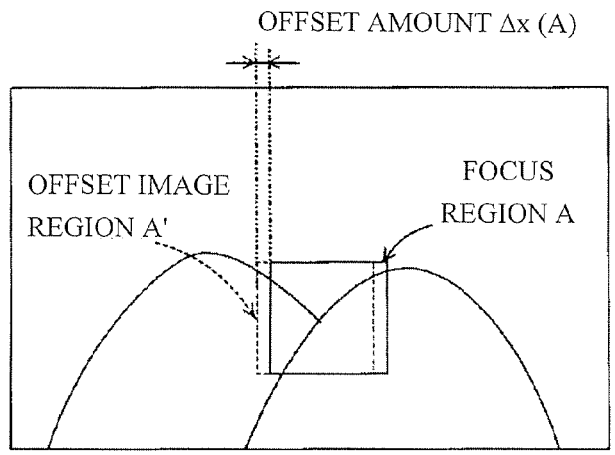
FIG. 4 is a view showing the synthesis of a double image.
Figure 4:
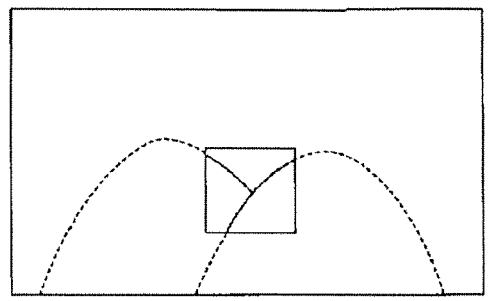
Figure 4:
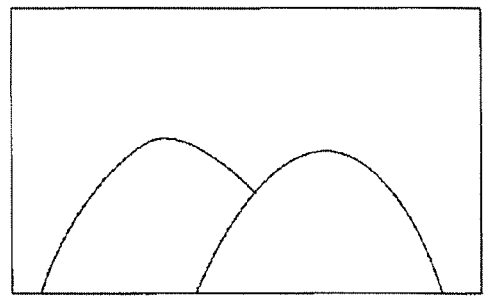
Figure 4:
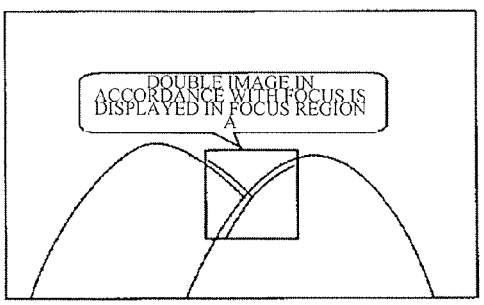
Figure 5:
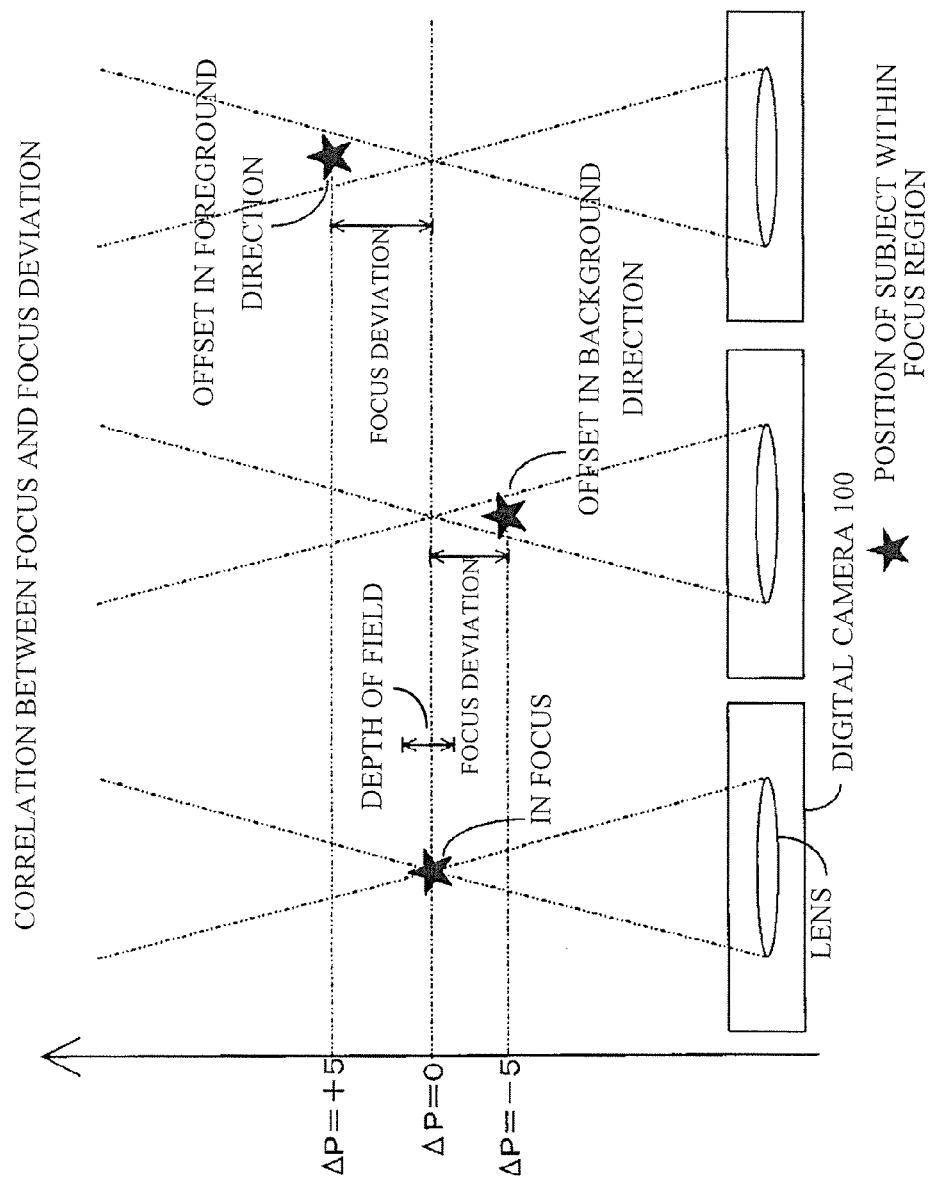
FIG. 5 is a view showing the relationship between focus and focus deviation.
Figure 6:
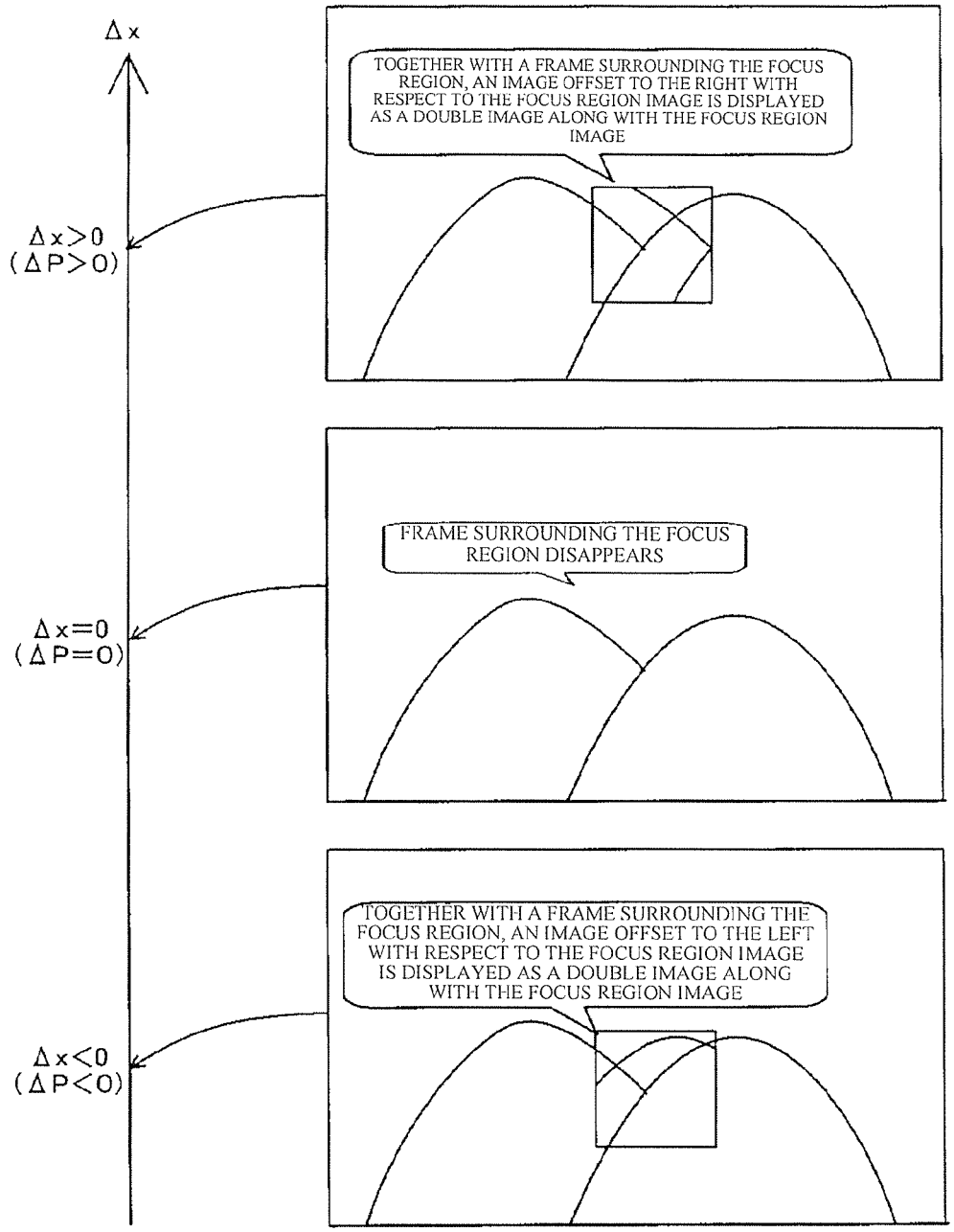
FIG. 6 is a view showing the relationship between the focus deviation and the deviation amount.

FIG. 4 is a view showing the synthesis of the double image, FIG. 5 is a view showing the correlation between the focus and the focus deviation $\Delta P$, and FIG. 6 is a view showing the correlation between the focus deviation $\Delta P$ and the deviation amount $\Delta x$ generated in the double image. The deviation amount $\Delta x$ is a quantity which corresponds to the misalignment between the image originally displayed in the focus region of the display image data D2 and the image overlapped by the original image.

The relationship between the focus, the focus deviation $\Delta P$, and the deviation amount $\Delta x$ will first be described with reference to FIGS. 5 and 6. The focus deviation $\Delta P$ and the deviation amount $\Delta x$ are positively correlated; the larger the focus deviation $\Delta P$ is, the larger the deviation amount $\Delta x$ is, and the smaller the focus deviation $\Delta P$ is, the smaller the deviation amount $\Delta x$ is. The sign of the deviation amount changes according to whether the focus deviation is in the foreground direction or the background direction, and the direction of the offset changes according to the direction of the focus deviation.

In the example shown in FIG. 6, the offset direction is left or right depending on whether the focus deviation is in the foreground direction or in the background direction, and since the deviation amount gradually increases in the + direction from 0 when the focus deviation is in the foreground direction, the offset direction as shown in FIG. 6 is to the right. Since the shift amount gradually increases in the − direction from 0 when the focus deviation is in the background direction, the offset direction as shown in FIG. 6 is to the left. Of course, the offset direction may be up or down, an oblique direction, or another direction, and various modifications to the offset direction may be made, such that the offset may occur in the left direction when the focus deviation is in the foreground direction, the offset may occur in the upward direction when the focus deviation is in the background direction, or the offset may occur in the left direction both when the focus deviation is in the foreground direction and when the focus deviation is in the background direction.

The correlation between the focus deviation $\Delta P$ and the deviation amount $\Delta x$ is expressed by an arithmetic expression or a correspondence table, and in the present embodiment, this correlation is stored in advance in the flash memory 20c. The focus unit M3 can calculate the shift amount $\Delta x$ from the focus deviation $\Delta P$ on the basis of the correlation stored in the flash memory 20c.

When the shift amount $\Delta x$ is computed, the display controller M2 then creates a double image. The display controller M2 combines an offset image of an offset image region A' in which the focus region A is offset by the deviation amount $\Delta x$ (A) to the left in FIG. 4 with the focus region A. Specifically, the pixels of the focus region A are selected in sequence as target pixels, and the pixel data of the target pixels in the display image data D2 and the pixel data of positions offset by the amount $\Delta x$ (A) from the target pixels are acquired. The arithmetic mean or weighted average of the sets of pixel data is taken to obtain pixel data for the target pixels of composite image data D3 for expressing the composite image. The display image data D2 are used without modification as the pixel data of pixels other than those of the focus region A in the composite image data D3. The focus region A thereby becomes a double image.

When the composite image data D3 is created as described above, the display controller M2 outputs a composite image to the EVF 58 on the basis of the composite image data D3 (S 110). As a result, an image offset from the original image by an amount commensurate with the deviation amount Δx is displayed in the focus region A in the EVF 58, as shown in FIG. 4. By viewing the amount of offset from the original image, the user can visually comprehend the focus deviation in the focus region A. As shall be apparent, since the original image also remains in the focus region, although the offset image added to the focus region and the image outside the focus region A are formed discontinuously, the original image of the focus region A is formed continuously with the image outside the focus region A. Consequently, the user can visually comprehend the focus deviation on the basis of the amount of deviation of the double image, and can also recognize the overall image.

As shown in FIG. 6, a frame surrounding the focus region is displayed when the composite image is displayed. Displaying the frame enables the user to easily identify the position and range of the focus region A, as well as to clearly recognize the boundary between the focus region A and the region outside the focus region A. The focus frame may also be configured so as to disappear once focus has been achieved, as shown in FIG. 6. The frame may also be displayed in a different color when focus is achieved and when focus is not achieved. For example, the frame may be displayed in an achromatic color such as white or black when focus is not achieved, and in a chromatic color when focus is achieved. Of course, a chromatic color may also be displayed when focus is not achieved, and an achromatic color displayed when focus is achieved. The user can thus even more clearly recognize the position and range of the focus region A and the boundary of the focus region A, and can reliably and visually recognize the instant at which focus is achieved.

The display controller M2 then determines whether the focus operation has been performed (S115). The reason for this is that the double image must be updated to reflect the change in the focus deviation ΔP in the focus region A that occurs when the focus is changed. The display controller M2 determines whether a focus operation via the operating unit 18 has been performed, and executes steps S105 through S110 when a focus operation has been performed (S115: Yes). A composite image created based on the new focus deviation ΔP is thereby displayed in the EVF 58.

When a focus operation has not been performed (S115: No), a determination is made as to whether a change has been applied to the focus region (S120). The reason for this is that when a change is applied to the focus region, the range for determining the focus deviation changes, and the area for forming the double image changes. A change in the focus region is defined as a change in the position or size of the focus region, and may also be addition or deletion of a focus region, as described hereinafter. In step S110, the display controller M2 determines whether an operation has been performed for confirming a change to the focus setting via the operating unit 18, and when the focus setting has been changed (S120: Yes), steps S100 through S110 are executed, and a composite image created based on the changed focus setting is displayed in the EVF 58. When a focus operation has not been performed, the process proceeds to step S130 (S120: No).

In step S130, the display controller M2 determines whether an indication to capture an image has occurred. In the present embodiment, image capture is triggered by pressing the shutter button 18b. The display controller M2 monitors operation of the shutter button 18b, and when the shutter button 18b is pressed, the process proceeds to step S135 (S130: Yes). On the other hand, when the shutter button 18b is not pressed, the process returns to step S105 after a predetermined time has elapsed, and the image displayed in the EVF 58 is updated by repeating the processing of steps S105 through S110. At this time, since detection of focus deviation and the processing which uses the focus deviation are repeated, an image that is in accordance with the current focus deviation is displayed in the EVF 58 even when the subject or the camera are moving.

In step S135, the imaging unit M1 controls the components 11 through 15, thereby executing the imaging process. First, a shutter screen (not shown) of the optical system 11 is opened for a predetermined period of time, and an optical image of a subject included in the imaging range is acquired by the imaging element 12. Various types of image processing are applied by the image processor 14 to the digital image signal digitized by the AFE 13, thereby creating image data D1, and the compression unit 15 compresses the image data D1 into JPEG image data. The JPEG image data thus created are written from the data storage unit 16 to the removable memory. When storage of RAW data is selected, the image data are written to the removable memory without applying image processing to the digital image signal outputted by the AFE.

(3) Various Modifications
(3-1) First Modification

In the embodiment described above, a composite image is created so that an image of the focus region A is displayed as a double image, but the range displayed as a double image is not necessarily limited to the focus region A. For example, a configuration may be adopted in which the entire display image is displayed as two offset images according to the focus deviation of the focus region A. The focus region A may also be displayed as a single image, and a range other than the focus region A may be displayed as an offset double image so that the region outside the focus region A is displayed as an offset double image. The former example will be described.

Figure 7:
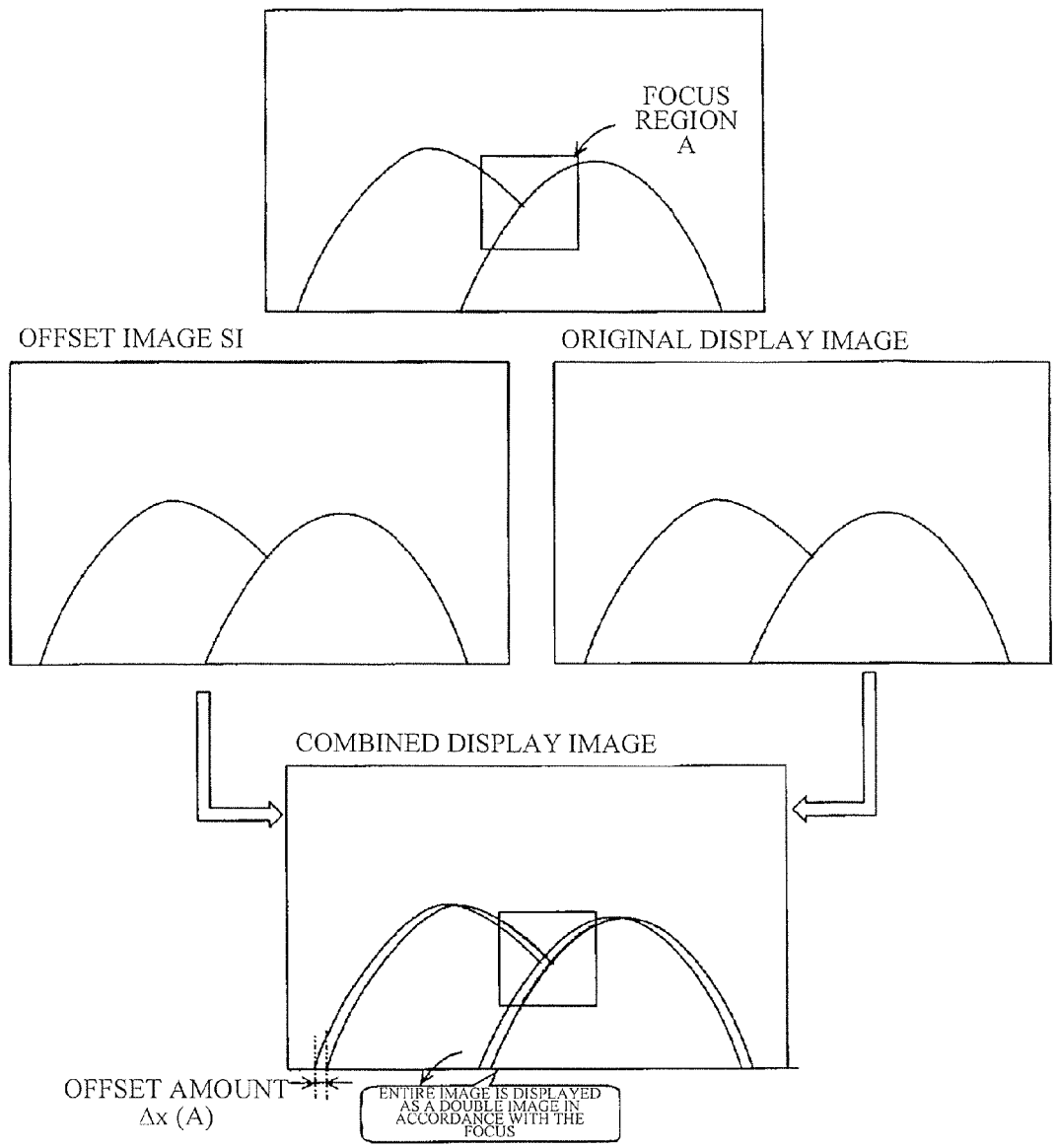
FIG. 7 is a view showing a case in which the entire display image is shown as a double image in accordance with the focus deviation.

FIG. 7 is a view showing a case in which the entire display image is doubled in accordance with the focus. As shown in FIG. 7, a focus region A is set in the captured image, and the display controller M2 acquires the focus deviation ΔP in the focus region A from the focus unit M3. The display controller M2 then computes a shift amount Δx which is in accordance with the focus deviation ΔP on the basis of a correlation stored in the flash memory 20c, and combines an offset image of an offset image region A' in which the entire display image is offset by the deviation amount Δx (A) to the left in FIG. 7 with the focus region A. The specific method of synthesis is the same as in the embodiment described above. Part of the offset image is not combined, but this part may remain the same as in the original display image. At this time, a frame may be displayed indicating the boundary between the synthesized part of the image and the non-synthesized part of the image, or the frame may disappear or change color when focus is achieved, as in the embodiment described above. Displaying the entire image as a double image in this manner enables the focus deviation to be clearly visible even in a small display unit such as the EVF 58.

(3-2) Second Modification

An example of setting only a single focus region A is described in the embodiment above, but a plurality of focus regions A may be set. In the following description, the reference symbols A1, A2, and A3 are used to indicate a plurality of focus regions, and the reference symbols A1', A2', and A3' are used to indicate offset image regions set so as to correspond to the respective focus regions. The reference symbols SI (A1), SI (A2), and SI (A3) are used to indicate the offset images acquired from the offset image regions.

Figure 8:
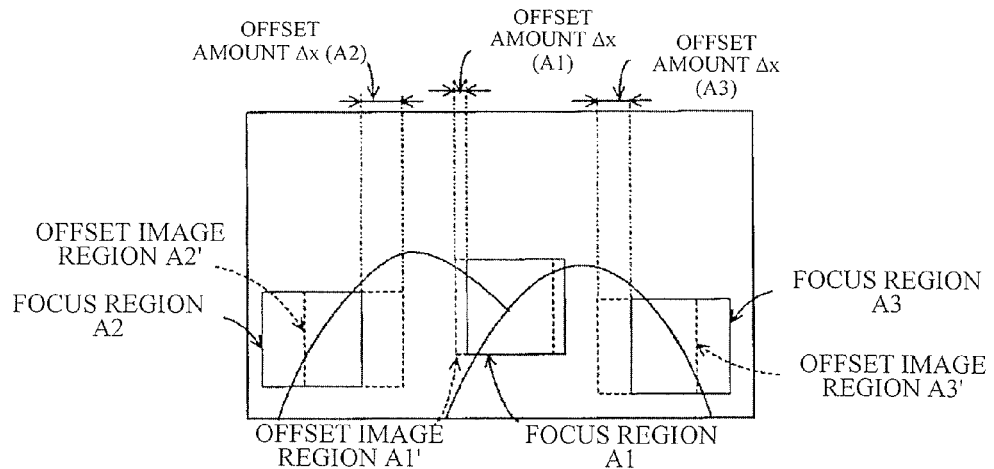
FIG. 8 is a view showing the double images in a case in which a plurality of focus regions is set.
Figure 8:
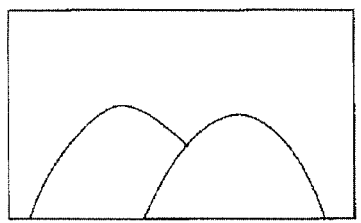
Figure 8:
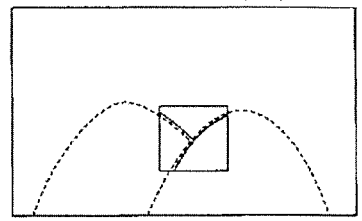
Figure 8:
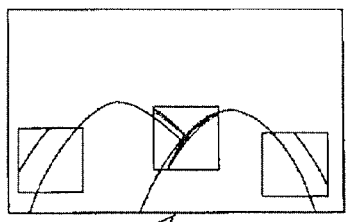
Figure 8:
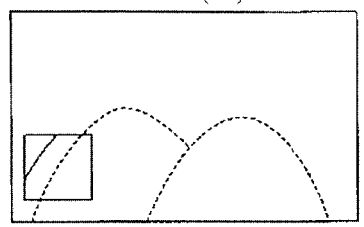
Figure 8:
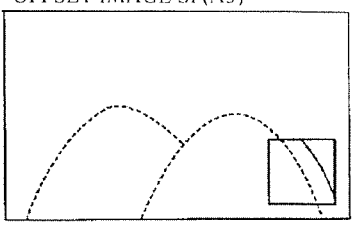

FIG. 8 is a view showing a case in which images of focus regions are doubled in a case in which a plurality of focus regions is set. As shown in FIG. 8, the display controller M2 acquires focus deviations AP (A1), AP (A2), and AP (A3) of the focus regions A1, A2, and A3, respectively, from the focus unit M3. The display controller M2 then computes shift amounts Δx (A1), Δx (A2), and Δx (A3) from the focus deviations ΔP (A1), ΔP (A2), and ΔP (A3), respectively, on the basis of a correlation in the flash memory 20c. The display controller M2 sets offset image regions A1', A2', and A3' in positions where the focus regions are shifted by each shift amount, and acquires offset images SI (A1), SI (A2), and SI (A3) from the respective offset image regions.

The display controller M2 then combines the data indicating each offset image with each focus region in the original display image data to create composite image data, which are outputted to the EVF 58 as display image data. As a result, a composite image is displayed in the EVF 58 in which images offset by amounts in accordance with the focus deviation of each focus region are superposed on each focus region. Since a double image indicating the degree of focus deviation is displayed for each focus region, it is possible to assess the focus in a plurality of locations of the captured image. The focus in each location of the image can thereby be easily comprehended, and the overall direction of the focus of the image can be easily assessed.

The focus regions in the present embodiment are added, removed, and resized through the use of the operating unit 18. For example, settings relating to a focus region are provided in a setting menu, and a mode for making settings relating to the focus region is entered by a predetermined operation of the operating unit 18. In this mode, various settings for a focus region can be made by using the cursor operation key 18d, for example, such as indicating the position of a new focus region, and selecting an existing focus region and deleting the focus region or changing the size or position thereof. Of course, this operation is merely an example, and various publicly known methods may also be used as appropriate.

(3-3) Third Modification

In the embodiment described above, an example is described of an MF-type DSC in which the focus is adjusted manually, but the DSC of the present embodiment may also be capable of AF operation for automatically adjusting the focus of a focus region. Enabling MF operation and AF operation to be switched enhances convenience for the user. By providing the DSC with a passive-type AF mechanism, when the focus unit M3 of the embodiment described above detects a focus deviation, the focus deviation can also be detected in the focus region by a mountain-climbing method whereby the image signal in the focus region is subjected to high-frequency decomposition while the focus is changed.

(3-4) Fourth Modification

A case in which a composite image is displayed in the EVF 58 is described as an example in the above embodiment, but the composite image may also, of course, be displayed on an LCD 50. A configuration may also be adopted in which the composite image can be selectively displayed by the EVF 58, the LCD 50, or both the EVF 58 and the LCD 50 on the basis of an operation of the operating unit 18.

(3-5) Fifth Modification

A case in which the drive mechanism of the optical system 11 is driven under the control of the display controller M2 is described as an example in the above embodiment, but an operating unit may also, of course, be provided for manually adjusting the drive mechanism by a mechanical mechanism such as a rack and pinion.

(3-6) Sixth Modification

In the embodiment described above, the display controller M2 combines an offset image of an offset image region A' in which the focus region A is offset with the focus region A of the original image. However, the offset image and the original image may be made more easily distinguishable by changing the color of at least one of the original image and the offset image when the images are combined. Specific methods for changing the color may include creating a reddish offset image or original image by multiplying the red component by 1.5, making the offset image or the original image entirely monochrome, or combining the original image and the offset image so that only the green component of the focus region A of the original image is used, only the red component and blue component of the offset image is used, and the original image outside the focus region A is left unmodified.

(4) Conclusion

According to the embodiment described above, a focus unit M3 for detecting a focus deviation, and a display controller M2 for causing a display unit 19 to display a composite image which is an arithmetic mean or weighted average of an offset image SI in a position offset from a focus region in accordance with the focus deviation with respect to the focus region A of the display image, are provided in a DSC 100 for displaying on the display unit 19 an image which is based on display image data D2 generated based on light received by an imaging element 12. Focus can thereby be visually and easily comprehended without a reduction in the ability to preview an image.

The present invention is not limited to the embodiment and modifications described above, and also includes configurations in which the configurations disclosed in the embodiment and modifications are substituted with each other, combined, or changed, or configurations in which publicly known techniques and the configurations disclosed in the embodiment and modifications are substituted with each other, combined, or changed.

The entire disclosure of Japanese Patent Application No. 2009-274821, filed Dec. 2, 2009 is incorporated by reference herein.

What is claimed is:

1. An imaging device comprising:
an imaging element which is configured to receive light from an object;
a display unit which includes a display region with a focus region, said display unit displaying image data of said object from said imaging element on said display region, said focus region being adjustable with respect to said display region;
a focus unit which is configured to detect a focus deviation; and
a display controller which is configured to acquire a first image of said object corresponding to said focus region and a second image of said object corresponding to said focus region based on said image data of said object, and cause said display unit to superpose the first image of the object and the second image of the object with respect to each other such that the first image of the object and the second image of the object are displayed in said focus region simultaneously, a position of the first image of said object being stationary when the first image of said object is displayed in the said focus region with respect to the image data of the object irrelevant to said focus deviation, a position of the second image of the object being moved when the second image of said object is displayed in the said focus region with respect to said image data of the object in accordance with said focus deviation.

2. The imaging device according to claim 1, wherein said display controller causes said display unit to change at least one of a color of the first image and a color of the second image.

3. The imaging device according to claim 1, wherein said display controller causes said display unit to further display a frame which differs between a focused state and an unfocused state, the frame surrounding said focus region.

4. The imaging device according to claim 1, wherein said display controller causes said display unit to further display a frame surrounding said focus region when the image is in focus, and causes said display unit to not display a frame surrounding said focus region when the image is not in focus.

5. The imaging device according to claim 1, wherein said display controller causes said display unit to further display a frame surrounding said focus region when the image is not in focus, and causes said display unit to not display a frame surrounding said focus region when the image is in focus.

6. The imaging device according to claim 1, wherein said focus unit detects said focus deviation in said focus region that is predetermined; and said display controller causes said display unit to display the first image and the second image in said focus region in accordance with said focus deviation.

7. The imaging device according to claim 6, further comprising an operating unit operated by a user; wherein said display controller sets a plurality of said focus regions in accordance with a predetermined operation performed by using said operating unit.

8. The imaging device according to claim 1, wherein said focus region is smaller than said display region.

9. An image display method comprising:
receiving light from an object;
generating image data on the basis of said light;
detecting a focus deviation; and
causing a display unit including a display region with a focus region that is adjustable with respect to said display region to superpose a first image of said object and a second image of said object with respect to each other such that the first image of the object and the second image of the object are displayed in said focus region simultaneously, the first image of said object and the second image of said object being acquired based on said image date of said object and corresponding to the focus region based on said image date of said object,
a position of the first image of the object being stationary when the first image of said object is displayed in the said focus region with respect to said image data of the object irrelevant to said focus deviation, a position of the second image of the object being moved when the second image of said object is displayed in the said focus region with respect to said image data of the object in accordance with said focus deviation.

10. A non-transitory computer readable medium storing an image display program for causing a computer to implement a function for displaying image data of an object, said image display program comprising:
code for receiving light from said object;
code for generating said image data on the basis of said light;
code for detecting a focus deviation; and
code for causing a display unit including a display region with a focus region that is adjustable with respect to said display region to superpose a first image of said object and a second image of said object with respect to each other such that the first image of the object and the second image of the object are displayed in said focus region simultaneously, the first image of said object and the second image of said object being acquired based on said image date of said object and corresponding to the focus region based on said image date of said object,
a position of the first image of the object being stationary when the first image of said object is displayed in the said focus region with respect to said image data of the object irrelevant to said focus deviation, a position of the second image of the object being moved when the second image of said object is displayed in the said focus region with respect to said image data of the object in accordance with said focus deviation.

* * * * *